W. E. LEVOY.
Side-Hill Plow.
No. 67,890.
Patented Aug. 20, 1867.
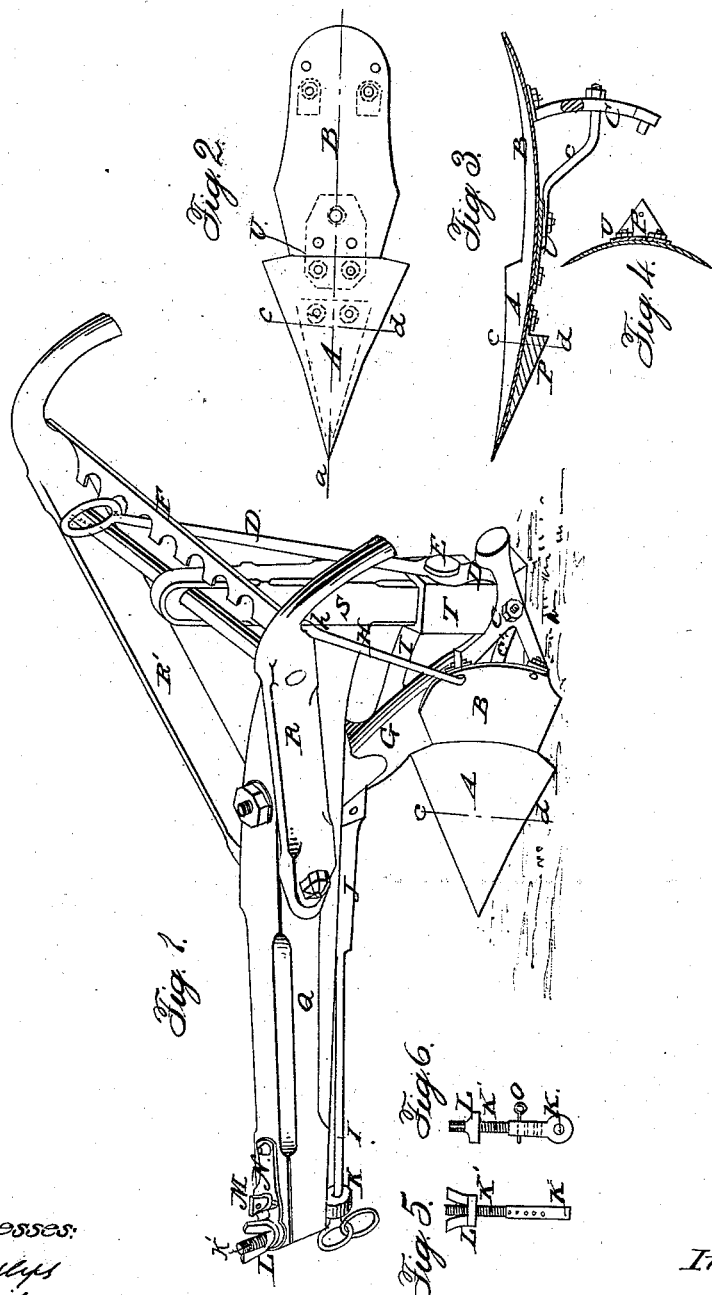

United States Patent Office.

W. E. LEVOY, OF CINCINNATI, OHIO.

Letters Patent No. 67,890, dated August 20, 1867.

IMPROVEMENT IN PLOUGHS.

*The Schedule referred to in these Letters Patent and making part of the same.*

---

Be it known that I, W. E. LEVOY, of the city of Cincinnati, in the county of Hamilton, and State of Ohio, have invented a new and useful Improvement in Ploughs; and I do hereby declare that the following is a full, clear, and exact description of the construction and operation of the same, reference being had to the annexed drawings, making part of this specification, in which—

Figure 1 is a perspective view of my improved plough.

Figure 2, a front or full view of my improved mould-board and point and share, and Figure 3 is a cut section through $a\ b$ of fig. 2, showing the several parts, and the manner of connecting them together.

Figure 4 is a cut section through the line $c\ d$.

Figure 5 is a side view of the adjusting-bar, and

Figure 6 is an end view of the same.

The same letters refer to the same things in the several figures.

A is the share point and cutter, of steel, B the mould-board, C the brace which connects the mould-board with the land-side. D is the lever, which adjusts the "land" of the plough by simply shifting it in the ratchet-bar F, fig. 1. E is fulcrum-pin, on which D turns; F a ratchet or toothed bar, attached to the lower side of the handles for the purpose of keeping D in any required position; G the upright or sheath; H the shackle or steady-bar to keep the plough in position; I a brace from the socket T; J the draught-bar; K K' the adjusting-bar, to regulate the depth of furrow, with its nut L; M, clevis-pin; N the clevis; O, bar-pin; P the metal point or bed to which the share and point are attached; Q the beam; R R' the handles; S the uprights; T the socket for S; U the connecting-plate, to which the point and share A and the mould-board B are secured, and also the brace $c'$, as shown in fig. 3.

The peculiarities of my plough are these: The form of the point and share, and their being composed of one piece of steel, so attached to the mould-board and other parts of the plough as to be readily removed, sharpened, or repaired, and replaced again. The mould-board is concave in both its sections throughout, except the small lips immediately in the rear of the share. The shackle-bar or stay H is furnished with a sleeve and jam-nut, so as to be adjusted to any required length, thus affording a means of setting the share and mould-board to any desirable angle corresponding to the slope of the ground upon which it is being used, or for level land. It is adjustable to any required amount of land by means of the lever D and the rack F, without leaving the handles, or even stooping. The depth of furrow is regulated by means of the adjusting-bar K K', the nut L, and the pin O.

Claim.

What I claim as my improvement and invention, and desire to secure by Letters Patent, is—

1. The mode of adjusting the land of the plough, substantially as set forth and described.

2. I claim the peculiar form and curves of the mould-board B, substantially as set forth and described.

3. I claim the particular form and construction of the upright or sheath G, with the brace I, the socket T, and the draught-rod J, in connection with the adjustable bar K K', with the nut L and pin O, as set forth and described.

4. I claim adjusting the angle of the plough to any required slope of ground, or to level land, by means of the adjustable shackle-bar H, or its equivalent, substantially as set forth and described.

W. E. LEVOY.

Witnesses:
R. C. PHILLIPS,
JOHN A. DAILEY.